Jan. 12, 1960   H. C. EDWARDS   2,920,386
METHOD OF FORMING SPLINE SERRATIONS IN TAPERED BORES
Filed May 9, 1957
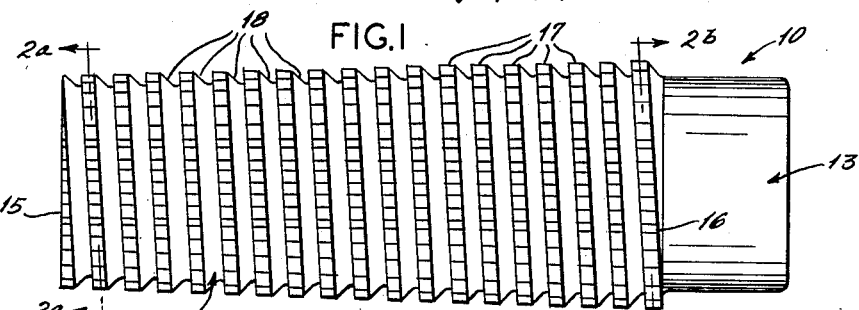
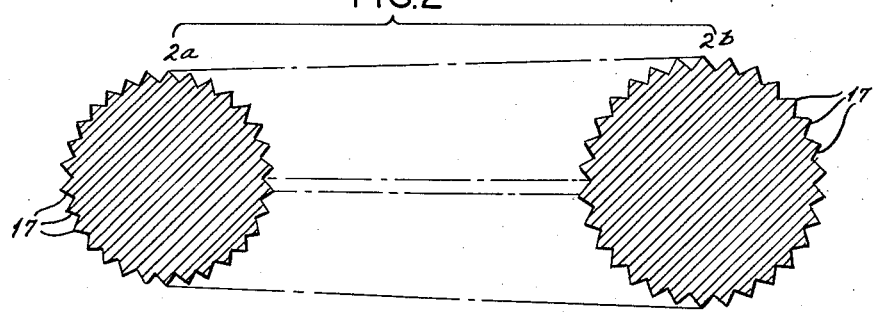
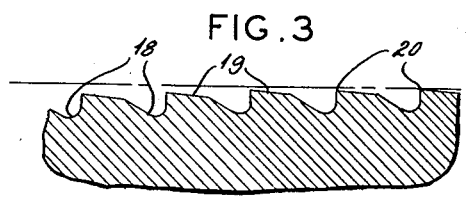
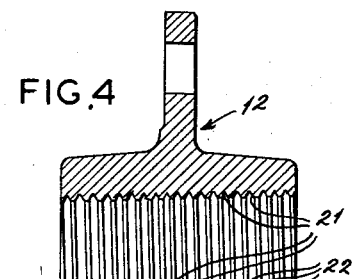
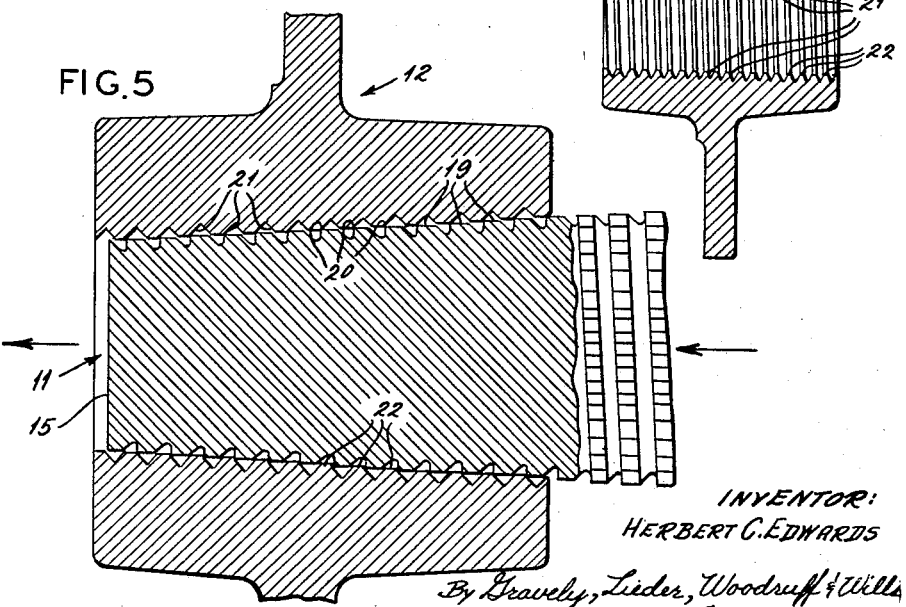
INVENTOR:
HERBERT C. EDWARDS
By Gravely, Lieder, Woodruff & Wills
ATTORNEYS.

United States Patent Office 2,920,386
Patented Jan. 12, 1960

2,920,386

METHOD OF FORMING SPLINE SERRATIONS IN TAPERED BORES

Herbert C. Edwards, Canal Fulton, Ohio, assignor to The Timken Roller Bearing Company, Canton, Ohio, a corporation of Ohio Application May 9, 1957, Serial No. 658,053

1 Claim. (Cl. 29—558)

This invention relates generally to broaching methods and more particularly to a method of forming spline serrations in tapered bores.

When a shaft is to be rigidly secured in the bore of an operating part, a particularly sturdy inter-fitting connection eliminating any looseness or relative circumferential movement therebetween may be provided by forming the bore and the shaft to have tapered axial surfaces with complementary spline serrations. Accordingly, the shaft may be wedged in the bore to prevent relative axial movement therebetween, and the complementary fit of the spline serrations prevents relative circumferential movement. In the past, no completely satisfactory method or tool for producing spline serrations in a tapered bore has been provided, especially where the part in which the bore is to be formed is of relatively hard high grade metals. It has been proposed to broach the serrations in a substantially cylindrical bore and swage the bore into a tapered or frusto-conical shape, but obviously this method is not possible unless the walls of the part are extremely thin or the part is formed of highly ductile material.

An object of the present invention is to provide a simplified, rapid method of producing spline serrations in a tapered bore thereby overcoming the disadvantages of prior art methods.

Other objects and advantages of the present method will become apparent hereinafter.

Briefly, the present invention comprises a method of forming spline serrations in a tapered bore including forming spaced grooves in the bore, providing a tapered broaching tool having spline serrations complementary to those to be formed in the bore, the serrations on the tool being interrupted by spaced grooves to form cutting teeth, inserting the tool into the bore until the cutting teeth are in contact with the lands of the bore wall, and exerting broaching pressure to move successive cutting teeth of the tool into the lands of the bore whereby the bore is provided with spline serrations.

In the accompanying drawing wherein a typical broaching tool for carrying out the present method is disclosed for purposes of illustration:

Fig. 1 is a side elevational view of a broaching tool for carrying out the present method.

Fig. 2 is a projected cross-sectional view showing the tooth construction at the ends of the broaching tool, 2a being a cross-sectional view taken along line 2a—2a of Fig. 1 and 2b being a cross-sectional view taken along line 2b—2b of Fig. 1.

Fig. 3 is a fragmentary axial cross-sectional view showing the tooth construction of the broaching tool.

Fig. 4 is a cross-sectional view of a part having a prepared tapered bore to be broached, and Fig. 5 is an enlarged cross-sectional view of the broaching tool shown positioned in the prepared tapered bore of the part of Fig. 4 for producing spline serrations therein.

Referring now to the drawing, it will be seen that a broaching tool 10 is provided for carrying out the present method of producing spline serrations in the tapered bore 11 of a part 12. The broaching tool 10 includes a chucking head or arbor 13 adapted to be secured in a suitable press or similar machine (not shown) for moving the broaching tool rectilinearly to effect a broaching operation, as will become apparent hereinafter. The tool 10 also includes a tapered shank portion 14 having a small end 15 and a large end 16. As shown best in Figs. 1 and 2, the shank portion 14 is provided with peripheral axially-extending serrations 17 each of which extends between the small and large ends 15 and 16. It is apparent that each serration 17 tapers between the ends because of the circumferential difference in size of the shank portion 14 at its ends 15 and 16. Accordingly, each serration 17 is small at the small end 15 and large at the large end 16, as shown in Fig. 2.

Referring now to Figs. 1 and 3, it will be seen that the serrations 17 on the shank portion 14 are interrupted intermediate the ends 15 and 16 by circumferential grooves 18 so that each serration 17 is formed into a plurality of teeth 19 arranged in axially spaced and aligned or tandem relationship and having cutting edges 20. The grooves 18 form chip clearance areas for the metal removed from a bore 11 during a broaching operation. Furthermore, the grooves 18 may be formed as a continuous helix, each turn of which is spaced an equal predetermined distance from the adjacent turns thereof, or the grooves 18 may be formed as axially-spaced annular grooves positioned in planes perpendicular to the axis of the broaching tool 10.

The bore 11 of the part 12 is initially formed with the required taper in any suitable manner, and is further prepared for broaching by providing spaced grooves 21 therein. The grooves 21 may be formed in the same manner as the grooves 18 of the broaching tool 10 in that they may either be formed as a continuous helix or as axially-spaced annular grooves.

Referring to Figs. 4 and 5, it will be seen that the spaced grooves 21 in the bore 11 define lands 22 therebetween, and it is apparent that these lands 22 are to be broached by the tool 10 to provide the fine pitch axial serrations in the bore 11 of the part 12 extending to the bottom of the grooves 21.

The broaching tool 10 is inserted axially into the bore 11 until the cutting edges 20 of the teeth 19 are in contact with the lands 22 (Fig. 5). If desired, the cutting teeth 19 of the tool 10 may be threaded part way into the grooves 21 of the part 12 inasmuch as the axial extent of each tooth 19 is less than the axial distance between adjacent lands 22. Of course, the cutting teeth 19 can only be threadedly received in the bore 11 when the grooves 21 are in the form of a helix. Broaching pressure is applied to move the tool 10 to the left in Fig. 5 (as shown by the arrow) so that the teeth 19 bite into the lands 22 and remove metal therefrom. The broaching tool 10 is moved a predetermined distance whereby successive teeth 19 of each serration follow the preceding teeth to enlarge the size of the serration being formed through the lands 22 until the full depth serration is formed. Accordingly, the bore 11 is provided with axially-extending serrations each of which has a plurality of axially spaced portions in stepped relationship but forming an essentially tapered serration from the small to the large end of the bore.

The grooves 21 of the bore 11 act as chip clearance areas and, in addition, greatly facilitate the broaching operation inasmuch as the cutting teeth 19 do not have to cut into solid material but work upon the several lands independently whereby the resistance of the part 12 to broaching pressure is minimized. However, the interrupted spline serrations produced in the bore 11 are not materially reduced in efficiency or strength, and a tapered shaft (not shown) having continuous spline serrations may be drawn into fixed abutting position to secure the part 12 to the shaft.

It will now be apparent that a greatly improved method has been provided for producing spline serrations in the tapered bore of a part adapted to be mounted on a shaft having tapered spline serrations thereon. The present method comprises the steps of providing a broaching tool having axially-extending tapered spline serrations which are interrupted by equally spaced grooves to define cutting teeth, forming a tapered bore in a part and providing axially-spaced grooves in the bore to define lands therebetween, inserting the broaching tool into the bore until the cutting edges of the teeth are abutting the lands of the bore, and applying broaching pressure on the tool to move it rectilinearly so that successive teeth will remove material from successive lands until the full depth serrations are formed. Inasmuch as the tool 10 is tapered, the depth of the serrations may be controlled by the distance the tool 10 is moved in the bore 11.

This invention also consists of all changes and modifications of the present method of producing spline serrations in a bore, which will be readily apparent to all those skilled in the art, the invention being limited only by the claim which follows.

What I claim is:

The method of forming spline serrations in and lengthwise of a tapered bore of a part comprising the steps of forming a tapered bore in a part, producing a plurality of equally-spaced annular grooves in the bore between the ends thereof to define a plurality of axially-spaced lands of decreasing diameter, and spline broaching each land individually by movement of a tapered broaching tool axially relative to the part until the broaching teeth substantially reach the bottoms of the grooves whereby successive teeth will remove material from successive lands to produce spline serrations complementary to the serrations of the broaching tool.

References Cited in the file of this patent

UNITED STATES PATENTS

| | | |
|---|---|---|
| 1,129,989 | Kelsey | Mar. 2, 1915 |
| 1,938,424 | Hart | Dec. 5, 1933 |
| 2,180,477 | Morton | Nov. 21, 1939 |
| 2,330,863 | Bonnafe | Oct. 5, 1943 |

FOREIGN PATENTS

| | | |
|---|---|---|
| 298,256 | Italy | July 2, 1932 |
| 463,730 | Great Britain | Apr. 5, 1937 |